United States Patent
Kondarev

(10) Patent No.: US 10,904,238 B2
(45) Date of Patent: Jan. 26, 2021

(54) ACCESS TOKEN MANAGEMENT FOR STATE PRESERVATION AND REUSE

(71) Applicant: SAP SE, Walldorf (DE)

(72) Inventor: Krassimir Kondarev, Walldorf (DE)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 16/034,880

(22) Filed: Jul. 13, 2018

(65) Prior Publication Data

US 2020/0021573 A1 Jan. 16, 2020

(51) Int. Cl.
*H04L 29/06* (2006.01)

(52) U.S. Cl.
CPC ........ *H04L 63/0807* (2013.01); *H04L 63/108* (2013.01)

(58) Field of Classification Search
CPC ... H04L 63/08; H04L 63/0807; H04L 63/108; H04L 63/0815; H04L 63/0884; H04L 9/32; H04L 9/3213; G06F 21/41
See application file for complete search history.

(56) References Cited

U.S. PATENT DOCUMENTS

| | | | |
|---|---|---|---|
| 6,119,219 A * | 9/2000 | Webb | G06F 9/30087 712/227 |
| 7,966,260 B2 | 6/2011 | Gernold | |
| 8,010,484 B2 | 8/2011 | Gernold | |
| 8,091,043 B2 | 1/2012 | Schubert et al. | |
| 8,316,380 B2 | 11/2012 | Keil et al. | |
| 8,533,796 B1 | 9/2013 | Shenoy et al. | |
| 8,745,635 B2 | 6/2014 | Balko et al. | |
| 8,849,691 B2 | 9/2014 | Sanabria et al. | |
| 8,904,343 B2 | 12/2014 | Balko et al. | |

(Continued)

FOREIGN PATENT DOCUMENTS

EP    18174048    *    5/2018

OTHER PUBLICATIONS

Beni et al., "A Voucher-Based Security Middleware for Secure Business Process Outsourcing," Engineering Secure Software and Systems: Proceedings of the 9th International Symposium, ESSoS 2017, Bonn, Germany, Jul. 3, 2017, pp. 19-35, 17 pages.

(Continued)

*Primary Examiner* — Kristine L Kincaid
*Assistant Examiner* — Shaqueal D Wade
(74) *Attorney, Agent, or Firm* — Fish & Richardson P.C.

(57) ABSTRACT

Techniques are described for managing access tokens in a computing environment. A proxy service can be configured to issue a first token to a workflow engine, the first token having a substantially unlimited lifetime to not time out during the workflow duration. The first token may be provided to the workflow in place of a shorter-lifetime token that may have otherwise been requested from a backend service. The first token may be used by the workflow engine to provide authorization for operations of the workflow. On completion of the workflow, the workflow engine may send an indication to the proxy service to request interactions with the backend service. The proxy service may request a second (e.g., limited-lifetime) token from the backend service, and use the second token to interact with the backend service on behalf of the workflow, thus acting as an intermediary between the workflow and the backend service.

20 Claims, 4 Drawing Sheets

(56) References Cited

U.S. PATENT DOCUMENTS

| | | | |
|---|---|---|---|
| 8,930,497 B1 | 1/2015 | Holmes et al. | |
| 8,972,868 B2 | 3/2015 | Schubert | |
| 9,721,230 B2 | 8/2017 | Trump et al. | |
| 10,425,465 B1* | 9/2019 | Jha | H04L 67/42 |
| 2007/0276715 A1 | 11/2007 | Beringer | |
| 2008/0115195 A1 | 5/2008 | Malek | |
| 2009/0064130 A1 | 3/2009 | Davis | |
| 2009/0099882 A1* | 4/2009 | Karabulut | G06Q 10/06 713/152 |
| 2009/0112873 A1 | 4/2009 | Nanjangud Bhaskar et al. | |
| 2012/0005659 A1 | 1/2012 | Bonanno et al. | |
| 2012/0271854 A1 | 10/2012 | Truong et al. | |
| 2013/0067476 A1 | 3/2013 | Rosenberg et al. | |
| 2014/0013315 A1 | 1/2014 | Genevski | |
| 2014/0123312 A1* | 5/2014 | Marcotte | G06F 21/33 726/28 |
| 2016/0301739 A1* | 10/2016 | Thompson | G06F 9/547 |
| 2017/0039046 A1 | 2/2017 | Henke et al. | |
| 2017/0039385 A1 | 2/2017 | Henke et al. | |
| 2017/0039492 A1 | 2/2017 | Henke et al. | |
| 2017/0039520 A1 | 2/2017 | Trump | |
| 2017/0039521 A1 | 2/2017 | Henke et al. | |
| 2017/0099281 A1* | 4/2017 | Trevathan | G06F 16/86 |
| 2018/0300471 A1* | 10/2018 | Jain | H04L 63/108 |
| 2019/0238598 A1* | 8/2019 | Mohamad Abdul | H04L 63/0807 |
| 2019/0364035 A1* | 11/2019 | Smolny | H04L 63/108 |

OTHER PUBLICATIONS

Extended European Search Report issued in European Application No. 18207484.9 dated Mar. 25, 2019, 8 pages.

* cited by examiner

ACCESS TOKEN MANAGEMENT FOR STATE PRESERVATION AND REUSE

BACKGROUND

A distributed computing environment, such as a cloud computing environment, can host various applications that execute on the environment. Subscribers to the distributed computing environment can request access to the application executing in the environment, instead of executing on the application locally on their own computing device. In some instances, the environment may provide various services that are usable by the application(s) that execute in the environment, such as database services among others. The environment can support various mechanisms to verify the identity of users who attempt to access the application(s) executing in the environment, and to confirm that such users are authorized to access the application(s).

SUMMARY

Implementations of the present disclosure are generally directed to access token management in a computing environment. More specifically, implementations are directed to techniques employing a proxy service that provides an access token with sufficient lifetime for a workflow to complete, that requests a limited lifetime access token to access a backend service, and that acts as an intermediary for interactions between the workflow and the backend service.

In general, innovative aspects of the subject matter described in this specification can be embodied in methods that include operations of: receiving, by a proxy service from an application workflow, a request for a first access token; in response to receiving the request for the first access token, providing the first access token from the proxy service to the application workflow, the first access token including at least one credential associated with a user of the application workflow, the first access token having a first lifetime that is at least a duration of the application workflow; receiving, by the proxy service from the application workflow, a request to access a backend service; in response to receiving the request to access the backend service, requesting by the proxy service a second access token from the backend service; receiving, by the proxy service from the backend service, the second access token including the at least one credential associated with the user of the application workflow, the second access token having a second lifetime that is shorter than the duration of the application workflow; and employing, by the proxy service, the second access token to interact with the backend service on behalf of the application workflow.

Implementations can optionally include one or more of the following features: the first access token and the second access token are arranged according to a version of the Open Authorization (OAuth) standard; the first access token is configured without a specified lifetime; the application workflow includes multiple tasks; the request for the first access token is sent to the proxy service on completion of a first task of the multiple tasks; the request to access the backend service is sent to the proxy service on completion of a last task of the multiple tasks; the request for the first access token is sent to the proxy service in response to a first user interaction with the application workflow; and/or the operations further include invalidating, by the proxy service, the first access token based on determining that interaction with the backend service on behalf of the application workflow is complete.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
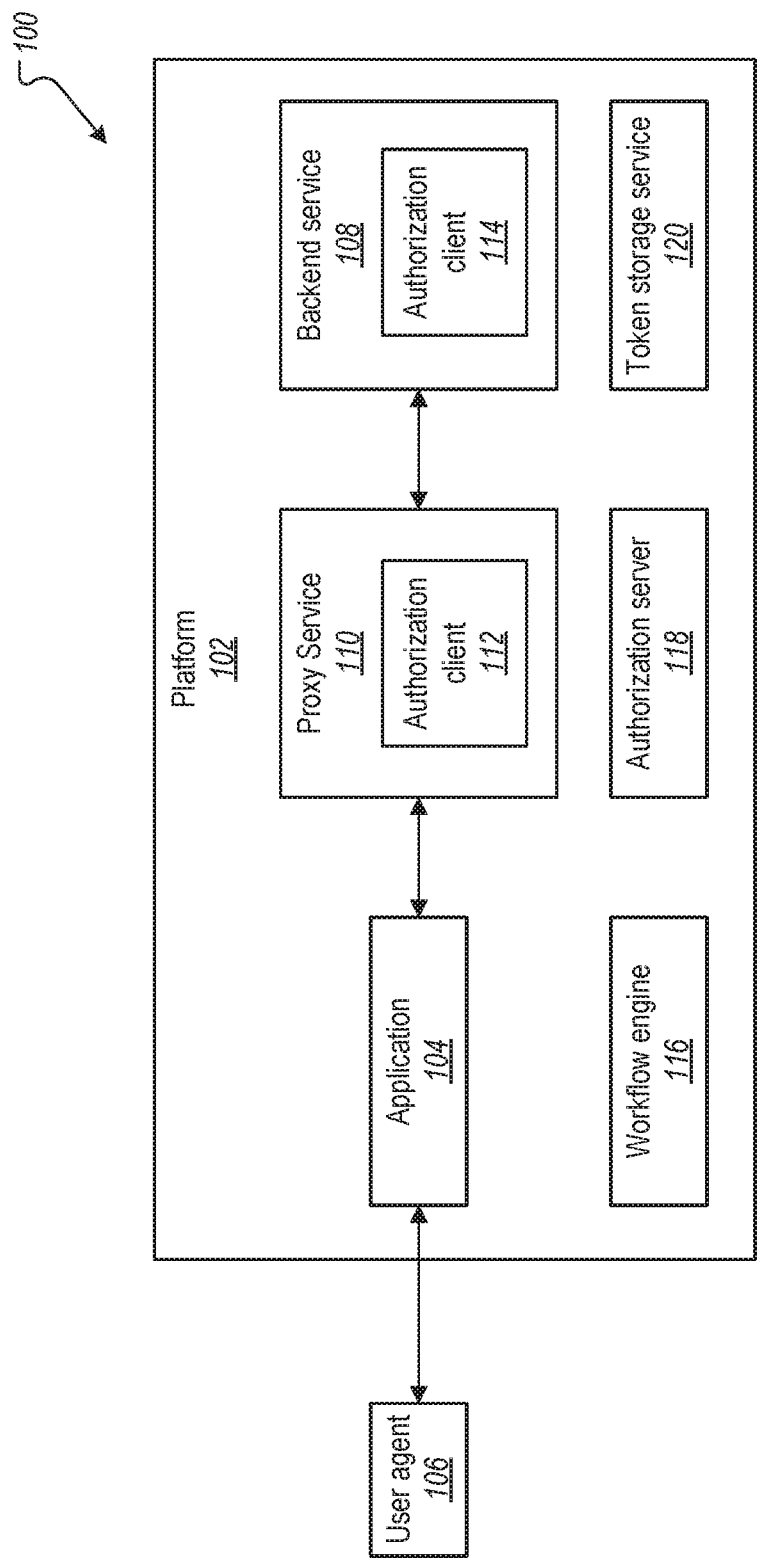
FIG. 1 depicts an example system for access token management, according to implementations of the present disclosure.

Implementations of the present disclosure are directed to systems, methods, computing devices, and/or computer-readable media for managing access tokens in a computing environment. In some implementations, a proxy service is configured to issue a first access token to an application workflow, in response to a request from the application workflow. The issued first access token may have a long and/or substantially unlimited lifetime, such that the first access token may not time out during the duration of the application workflow. The first access token may be provided to the workflow in place of a limited-lifetime access token that such a workflow may have otherwise traditionally requested from a backend service. The access token may be used by the application workflow to provide authorization for interactions of the application workflow with the proxy service. On completion of the application workflow, e.g., at a point when the workflow would typically access the backend service using the limited-lifetime access token, the workflow may send an indication to the proxy service to request interactions with the backend service. At that time, the proxy service may request a second limited-lifetime access token from the backend service. The proxy service may then use that second access token to interact with the backend service on behalf of the workflow, and thus act as an intermediary between the application workflow and the backend service. In this manner, implementations provide a mechanism by which an application workflow can operate with the appropriate authorization using the first (e.g., unlimited lifetime) access token, and interact with the backend service without interruption, even in instances where the backend service-issued access token would typically timeout prior to the completion of the workflow if the backend service-issued access token had been initially requested by the workflow instead of making such a request from the proxy service.

In some implementations, the access token(s) are arranged according to a version of the Open Authorization (OAuth) standard. Implementations also support the use of other authorization standards. An access token can include at least one credential that is associated with a particular user, and the access token can be issued to authorize that user to access a particular service. The first access token (e.g., with long or unlimited lifetime) can be requested by an authorization client (e.g., OAuth client) that is part of the proxy service, and the second access token (e.g., with limited lifetime) can be requested by an authorization client (e.g., OAuth client) that is part of the backend service. The authorization client of the proxy service can be configured to request access token(s) that do not include an explicit timeout or lifetime parameter. The authorization clients can request the access tokens from an authorization server (e.g., OAuth server) that is part of the platform. The distributed computing environment (e.g., a cloud computing environment) is also described herein as the platform, and can host any suitable number of applications that are offered as a service according to a software-as-a service (SaaS) model or other suitable paradigm.

Applications can be configured to store user state for later usage, for example to impersonate certain actions (e.g., calling a technical service or function) as if the actions were performed directly by a user. In workflow solutions, such as those which automate business process execution, this mechanism is known as Principal Propagation. For example, such usage can be included as part of an automated employee onboarding process to impersonate a manager, to automatically add required equipment items for a new employee into a shopping cart of a backend service as if the manager had added them manually, and then authorize the purchase of the items on behalf of the manager, instead of using a technical user to perform such actions. Through Principal Propagation, backend operations are perform using particular user credentials, but independently of the user and as if the user was directly performing the operations, e.g., to impersonate the user. User state can be preserved and reused via OAuth (e.g., OAuth2SAMLBearerAssertion flow), or some other suitable authorization standard.

An OAuth token lifetime depends on the to-be-called technical service, such as the backend service described herein. The OAuth client configuration is typically not under the control of the application or workflow runtime that is calling the backend service. Accordingly, the backend service OAuth client can issue a token with a short lifetime, such that the user state might expire unexpectedly before the OAuth access token is used to perform the actual technical/service call on behalf of the user to the backend service. Further, in some instances the duration of the workflow may not be deterministic, and can vary based on various factors that may be unpredictable at the start of the workflow.

Accordingly, it may not be possible to predict, in traditionally scenarios, whether an OAuth access token will still be valid at the time when the user impersonation is needed to interact with the backend service. This behavior might also differ from one service to another, based on the OAuth client configuration, which is also not under the control of the application or workflow runtime. OAuth in general has a token refresh mechanism, but this is not the case with the OAuth2SAMLBearerAssertion, which is used when user state has to be propagated, e.g., in a Principal Propagation scenario.

Traditionally, this leads to applications being unable to execute technical/service calls on behalf of a specific user. In the workflow domain this can mean that the workflow instance is not able to progress and has to be restarted, discarding all the work done so far on this instance, and without any guarantee that the second workflow execution will be successful.

To address these shortcomings in traditional, previously available solutions, implementations provide an additional (e.g., OAuth-protected) application service that is the proxy service discussed herein. The proxy service can also be described as an OAuth protected proxy service. The proxy service is used as a proxy between the user action and the actual usage of the user state when performing the technical/service call to the backend service, and can effectively prolong the token lifetime indefinitely and therefore eliminate the chance of token expiration. Accordingly, implementations provide an extension of traditional OAuth through use of the proxy service.

A workflow can include multiple tasks that each involve a direct user interaction carrying a user state, such as task completion, call to a REST API, and so forth. An OAuth access token can be obtained synchronously from the OAuth protected proxy service. Because the proxy service is associated with the application or workflow runtime, the authorization client (e.g., OAuth client) of the proxy service is configured to provide access tokens with unlimited lifetime, and/or with lifetime that is longer than any possible or expected duration of the workflow runtime.

Asynchronously, once the to-be-called backend service is reached in the workflow or application execution, which might be days, months or even years after the access token is initially obtained from the proxy service, the previously obtained access token is used to call the proxy service on behalf on the previously active user. Accordingly, implementations provide a solution in which it is guaranteed (or at least highly probable) that the token is still valid, since the proxy service OAuth client configuration is under application or workflow runtime control.

From within the proxy service, a second OAuth token is synchronously obtained from the backend service (and/or its OAuth client) for performing the technical/service call to the backend service on behalf of the previously active user. The obtained token has unknown lifetime, and may have a short lifetime compared to the duration of the workflow. However, because the technical/service call to the backend service is synchronously performed with the newly obtained token, the new token may have no time to expire before interactions with the backend service are completed.

In some implementations, only one OAuth access token is created on user action completion (e.g. on completion of a workflow user task), which can result in significant performance gain compared to previously available solutions, depending on the number of services invoked on behalf on the user. The access token lifetime may be under application and/or workflow runtime control through use of the proxy service authorization client, thus ensuring there may be no token expiration for the time until the technical/service call to the backend service is performed. The access tokens for performing the technical/service calls to the backend service can be created just before they are used, thus effectively eliminating the chance for access token to expire. For these reasons, in some implementations the applications or workflow engines using this mechanism can guarantee that performing technical/service calls on behalf of previously active users cannot fail due to access token expiration.

FIG. 1 depicts an example system 100 for access token management, according to implementations of the present disclosure. As shown in this example, the system 100 can include a platform 102 that provides the distributed computing environment for hosting any suitable number and type of application(s) 104. The platform 102 can also provide any other suitable type of computing environment, and may be hosted by any suitable number and type of computing devices. A user agent 106, such as a web browser or other client application, can interact with a platform-hosted application 104 over one or more networks. The user agent 106 can execute on any suitable type of computing device.

The platform 102 can also host any suitable number and type of backend services 108. The platform 102 can execute a proxy service 110 that acts as an intermediary between an application workflow and one or more backend services 108, to ensure authorization and user impersonation without timeout as described herein. In some implementations, the proxy service 110 can include an authorization client 112 (e.g., an OAuth client), and the backend service 108 can include an authorization client 114 (e.g., an OAuth client). The authorization clients can operate to request access tokens (e.g., OAuth tokens) from an authorization server 118 that executes on the platform 102 or elsewhere. The authorization server 118 can issue access tokens as requested by the authorization client, according to the configuration of the authorization client. As described above, the authorization client 112 of the proxy service 110 can request access tokens of unlimited lifetime.

The platform 102 can also provide a token storage service 120 for storage of the access tokens. When an access token is initially issued by the authorization server 118 through a request from an authorization client, the token can be stored by the service 120 in local storage on the platform 102 or external storage. Subsequently, the application(s) 104 and/or proxy service 110 can retrieve the access token from the service 120 when the token is to be used to establish authorization to perform an operation. In some implementations, the issuance of access tokens can be in response to an assertion that is made by the request, the assertion formatted according to a version of the Security Assertion Markup Language (SAML). An access token can include credential(s) to access a particular service on behalf of a particular user, and a particular token can be valid for a particular user and a particular service.

In some implementations, the platform 102 can execute a workflow engine 116 which manages the application workflow for each application 104 hosted by the platform 102. An application workflow for an application can include any appropriate number of tasks (e.g., operations), as described further below.

Figure 2:
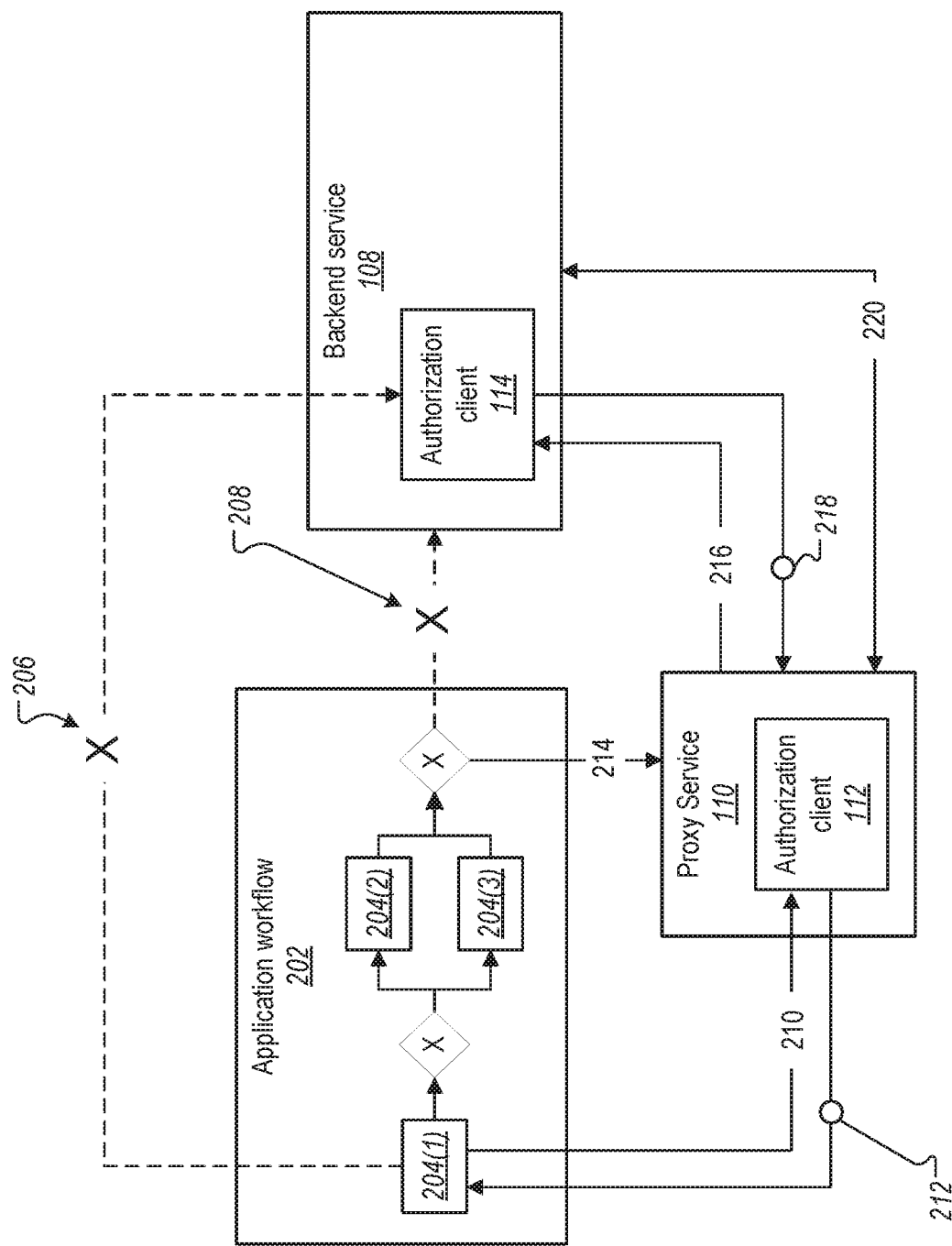
FIG. 2 depicts an example schematic illustrating a process for access token management, according to implementations of the present disclosure.

FIG. 2 depicts an example schematic illustrating a process for access token management, according to implementations of the present disclosure. As shown in the example, an application workflow 202 managed by the workflow engine of the platform, can include any suitable number of tasks 204 according to the particular application being managed. In the example shown, the workflow 202 includes an initial task 204(1) that can be followed by either a tasks 204(2) or a task 204(3) depending on the particular branch followed according to a condition, and either leads to a final state where the workflow 202 would traditionally make a call 208 to a backend service 108. In the traditional workflow execution, the first task would include a call 206 to the authorization client 114 of the backend service 108 to request an access token. However, traditionally the access token issued by the authorization client 114 of the backend service 108 may have a high probability of timing out before the workflow 202 would reach a point when is calls the backend service 108. Thus, the call to the backend service 108 would fail, requiring the issuance of another access token from the authorization client 114, which could also again time out prior to completion of the workflow 202.

To overcome such problems, implementations forego the traditional calls 206 and 208, and instead employ the proxy service 110 with an authorization client 112 that can request and issue access tokens of unlimited lifetime, or at least with a lifetime that is reliably longer than a possible duration of the workflow 202.

As shown in the example, on initiation of the task 204(1) and/or on a first user interaction with the workflow 202, the workflow engine can send a request 210 to the authorization client 112 of the proxy service 110. The authorization client 112 can respond by requesting an access token 212 from the authorization server, and providing the access token 212 to the workflow engine for use by the workflow 202. The access token 212 (also described as the first access token) can be issued without a lifetime, such that it may not automatically time out prior to completion of the workflow 202. The workflow 202 may then proceed through any number of tasks, using the token 212 to establish the user authorization to perform the various tasks 204.

When the workflow reaches a point when it would typically call the backend service 108, the workflow engine can send a signal 214 to the proxy service 110 indicating that a backend service operation is to be performed. In response, the proxy service 110 can send a request 216 to the authorization client 114 of the backend service 108. The authorization client 114 can request the access token 218 (also described as the second access token) from the authorization server, with a lifetime that is according to the configuration of the authorization client 114 (e.g., a short, limited lifetime). The access token 218 can be issued by the authorization server and provided by the authorization client 114 to the proxy service 110. The proxy service 110 can then use the token 218 to perform any number of operations 220 to interact with the backend service 108 on behalf of the workflow 202. The proxy service 110 can act as an intermediary between the workflow 202 and the backend service 108, such that communications between the workflow 202 and backend service 108 pass through the proxy service 110. In some implementations, the backend service 108 is not aware of the presence of the proxy service 110, and interacts with the proxy service 110 as if it were interacting with the workflow 202 directly. The tokens 212 and 218 may both include the same credential(s) for the user who is authorized to perform the operations, and in some examples may be identical apart from having different lifetimes.

In this manner, implementations provide a solution in which a user session can be prolonged (e.g., indefinitely) to enable Principal Propagation to operate successful in long workflow scenarios. The solution obtains a token (e.g., an "artificial" token) that can hold the user credential(s) but has no timeout, effectively prolonging the user session indefinitely. The token with the unlimited lifetime is used to obtain the (e.g., actual) token with limited lifetime, which is then used for execution against the backend service. This new token is obtained shortly before its use, so it that is does not have time to expire as in the traditional scenario described above. When the workflow instance is completed, the issued tokens (e.g., first and/or second token) can be invalidated, to maintain security.

Figure 3:
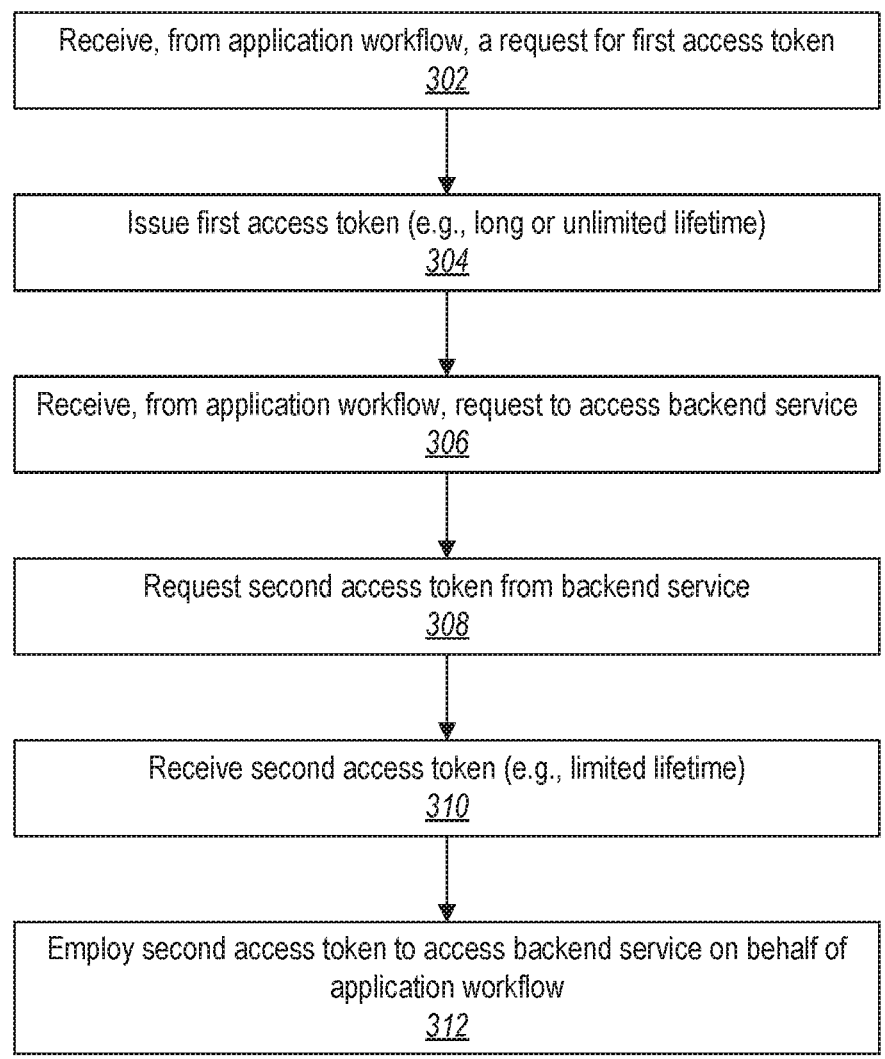
FIG. 3 depicts a flow diagram of an example process for access token management, according to implementations of the present disclosure.

FIG. 3 depicts a flow diagram of an example process for access token management, according to implementations of the present disclosure. Operations of the process can be performed by the proxy service 110 and/or other software module(s) executing on the platform 102 or elsewhere.

A request is received (302), from the workflow 202, for a first access token. The first access token can be issued (304) to the workflow 202, with a long or substantially unlimited lifetime that is at least as long as a possible, expected, and/or typical duration of the application workflow 202. The workflow 202 may then proceed through its various task(s), using the first access token to establish user authorization for its task(s).

At a point when the workflow 202 would typically attempt to access a backend service 108, the workflow 202 can send a signal to indicate that it needs to interact with the backend service 108. On receiving (306) such a request from the workflow 202, the proxy service 110 can request (308) the second access token from the backend service 108 (and/or its authorization client). The second access token may have a short lifetime, such that the token would have expired during the duration of the workflow 202 had the workflow 202 initially requested the token from the backend service 108 instead of from the proxy service 110. The proxy service 110 can receive (310) the second access token from the backend service 108, and subsequently employ (312) the second access token to access the backend service 108 on behalf of the workflow 202, thus intermediating the interactions between the workflow 202 and the backend service 108.

Figure 4:
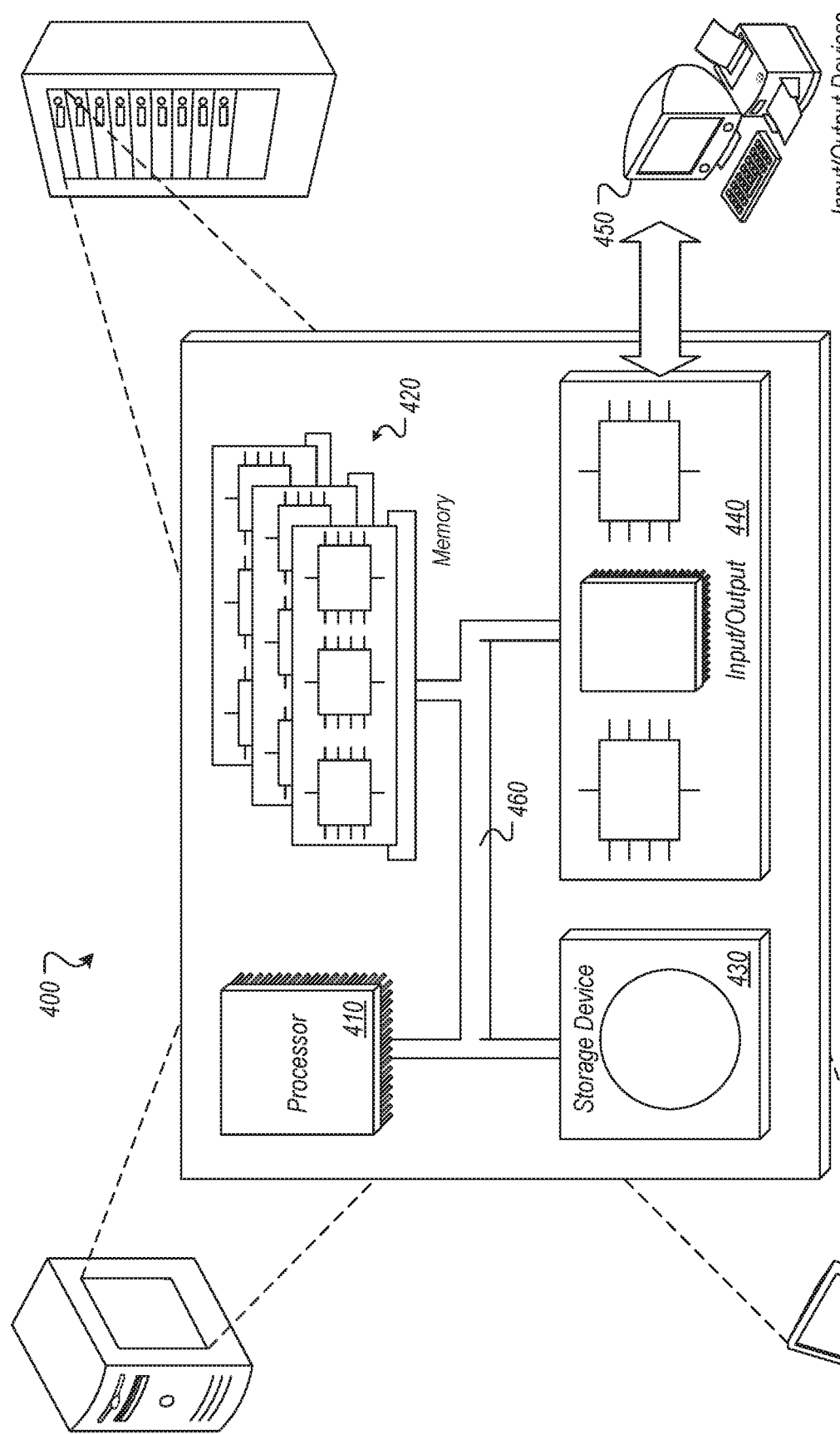
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the platform 102, the computing device executing the user agent 106, and/or other computing device(s) or system(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display)

monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by a proxy service executed by at least one processor, the method comprising:
   receiving, by the proxy service from an application workflow, a request for a first access token;
   in response to receiving the request for the first access token, providing the first access token from the proxy service to the application workflow, the first access token including at least one credential associated with a user of the application workflow, the first access token having a first lifetime that is at least a duration of the application workflow;
   receiving, by the proxy service from the application workflow, a request to access a backend service;
   in response to receiving the request to access the backend service, requesting by the proxy service a second access token from the backend service;
   receiving, by the proxy service from the backend service, the second access token including the at least one credential associated with the user of the application workflow, the second access token having a second lifetime that is shorter than the duration of the application workflow; and
   employing, by the proxy service, the second access token to interact with the backend service on behalf of the application workflow.

2. The method of claim 1, wherein the first access token and the second access token are arranged according to a version of Open Authorization (OAuth) standard.

3. The method of claim 1, wherein the first access token is configured without a specified lifetime.

4. The method of claim 1, wherein:
   the application workflow includes multiple tasks; and
   the request for the first access token is sent to the proxy service on completion of a first task of the multiple tasks.

5. The method of claim 4, wherein the request to access the backend service is sent to the proxy service on completion of a last task of the multiple tasks.

6. The method of claim 1, wherein the request for the first access token is sent to the proxy service in response to a first user interaction with the application workflow.

7. The method of claim 1, further comprising:
   invalidating, by the proxy service, the first access token based on determining that interaction with the backend service on behalf of the application workflow is complete.

8. A system, comprising:
   at least one processor; and
   a memory communicatively coupled to the at least one processor, the memory storing instructions which, when executed by the at least one processor, cause the at least one processor to perform operations comprising:
      receiving, by a proxy service from an application workflow, a request for a first access token;
      in response to receiving the request for the first access token, providing the first access token from the proxy service to the application workflow, the first access token including at least one credential associated with a user of the application workflow, the first access token having a first lifetime that is at least a duration of the application workflow;
      receiving, by the proxy service from the application workflow, a request to access a backend service;

in response to receiving the request to access the backend service, requesting by the proxy service a second access token from the backend service;

receiving, by the proxy service from the backend service, the second access token including the at least one credential associated with the user of the application workflow, the second access token having a second lifetime that is shorter than the duration of the application workflow; and employing, by the proxy service, the second access token to interact with the backend service on behalf of the application workflow.

9. The system of claim 8, wherein the first access token and the second access token are arranged according to a version of Open Authorization (OAuth) standard.

10. The system of claim 8, wherein the first access token is configured without a specified lifetime.

11. The system of claim 8, wherein:
the application workflow includes multiple tasks; and
the request for the first access token is sent to the proxy service on completion of a first task of the multiple tasks.

12. The system of claim 11, wherein the request to access the backend service is sent to the proxy service on completion of a last task of the multiple tasks.

13. The system of claim 8, wherein the request for the first access token is sent to the proxy service in response to a first user interaction with the application workflow.

14. The system of claim 8, the operations further comprising:
invalidating, by the proxy service, the first access token based on determining that interaction with the backend service on behalf of the application workflow is complete.

15. One or more non-transitory computer-readable media storing instructions which, when executed by at least one processor, cause the at least one processor to perform operations comprising:
receiving, by a proxy service from an application workflow, a request for a first access token;
in response to receiving the request for the first access token, providing the first access token from the proxy service to the application workflow, the first access token including at least one credential associated with a user of the application workflow, the first access token having a first lifetime that is at least a duration of the application workflow;

receiving, by the proxy service from the application workflow, a request to access a backend service;

in response to receiving the request to access the backend service, requesting by the proxy service a second access token from the backend service;

receiving, by the proxy service from the backend service, the second access token including the at least one credential associated with the user of the application workflow, the second access token having a second lifetime that is shorter than the duration of the application workflow; and employing, by the proxy service, the second access token to interact with the backend service on behalf of the application workflow.

16. The one or more non-transitory computer-readable media of claim 15, wherein the first access token and the second access token are arranged according to a version of Open Authorization (OAuth) standard.

17. The one or more non-transitory computer-readable media of claim 15, wherein the first access token is configured without a specified lifetime.

18. The one or more non-transitory computer-readable media of claim 15, wherein:
the application workflow includes multiple tasks; and
the request for the first access token is sent to the proxy service on completion of a first task of the multiple tasks.

19. The one or more non-transitory computer-readable media of claim 18, wherein the request to access the backend service is sent to the proxy service on completion of a last task of the multiple tasks.

20. The one or more non-transitory computer-readable media of claim 15, wherein the request for the first access token is sent to the proxy service in response to a first user interaction with the application workflow.

* * * * *